United States Patent Office

2,997,396
Patented Aug. 22, 1961

2,997,396
METHOD OF MAKING OLEOMARGARINE
Gerald C. North, Peter P. Noznick, and Benjamin A. Stiritz, all % Beatrice Food Company, 1526 S. State St., Chicago, Ill.
No Drawing. Filed Sept. 25, 1953, Ser. No. 382,468
8 Claims. (Cl. 99—122)

Our invention relates to a novel margarine and process of making the same. The improved product comprises a body of plastic margarine fat having uniformly dispersed therethrough discrete particles of fat encased in non-fat milk solids.

The primary object of the invention is to provide a margarine having a waxy body which dissolves readily in the mouth after the manner of butter and further is distinguished by the absence of the characteristic greasiness of conventional oleomargarine.

Another object of the invention is to provide an improved margarine which is substantially free of occluded air, such as air bubbles, so that its keeping properties are enhanced.

A further object of the invention is to provide an improved margarine which has the appearance of butter and is unlike most typical margarines in that it is brittle and breaks like regular churned butter at serving temperature, such as 45° to 50° F.

An additional object of the invention is to produce the improved margarine by a process of manufacture which is substantially continuous and in which the fat is subjected to a minimum of shearing action, thereby reducing greasiness. That is, the fat is treated by a relatively gentle shearing action, and in this manner the particles are not smeared and the protein on the fat particles is not rubbed off.

Hence, the invention provides a product which has markedly improved properties and characteristics which advantageously distinguish it from conventional margarines, and, moreover, teaches a new process for securing the improved margarine.

The invention will be more completely understood by reference to the following example:

*Example*

Margarine fat, such as hydrogenated cottonseed oil in amount of about 74% of the finished product is melted and agitated in a processing vat, such as a 300 gallon vat, which is baffled to create proper turbulence, and the melted fat is stirred from 15 to 20 minutes. The fat is then cooled to about 110° F.

To the melted fat there is added an emulsion having a temperature of about 40° F. and containing sweet skimmilk and about 30% margarine oil in sufficient amount to make an additional 6% fat in the finished product. There is also added to the melted fat enough additional sweet skimmilk at a temperature of about 40° F. to make a total of 17.35% skimmilk in the finished product. About .2% lecithin is added to the melted fat, and about .4% "Emargol" (.2 to .4% may be used), "Emargol" being an anti-spattering agent made by Emulsol Corporation, Chicago, Illinois, containing about 50% moisture, about 25% of sodium sulfoacetate derivatives of mono- and di-glycerides and about 25% of mono- and di-glycerides as emulsifiers, and about 2.25% salt, are added to the homogenized emulsion before the latter is added to the fat, but may be added to the additional skimmilk, and, if desired, suitable flavoring and coloring may be added to the fat.

The aforesaid fat-skimmilk emulsion is prepared by mixing the melted margarine fat, such as cottonseed oil, with an amount of sweet skimmilk to form about a 30% fat emulsion which is prepared by homogenizing the mixture so that the fat particles are finely divided and broken up so as to have a size between about .5 and 2.5 microns and are encased in non-fat milk solids. This emulsion is introduced into the melted fat in the vat, as stated, at a temperature of about 40° F. together with the salt and emulsifiers. The ingredients are all added to the melted fat in the vat at about the same time, and in any suitable manner, all being added preferably at a single point, namely, to the vat containing the melted fat.

It is important to maintain the melted fat in the vat always in melted condition and the fat is, therefore, usually kept at a temperature between 110° and 120° F. It is also important that the skimmilk, as well as the skimmilk-fat emulsion, be maintained at a temperature which will preclude freezing or souring before introduction to the melted fat, and a preferred temperature is between about 35° and 40° F. It is likewise equally important that the homogenized mixture be in the form of an emulsion with the fat globules in finely divided condition and encased in the non-fat milk solids, and a preferred homogenization pressure is between about 800 and 2,500 p.s.i.; the mixture may be passed one or more times through the homogenizer. All of the ingredients are thoroughly incorporated in the melted fat by suitable agitation to produce a uniform mixture.

This mixture having a temperature of about 100° F. is pumped at a pressure of about 200 p.s.i. through a double chilling tube of a chilling machine having parallel communicating chilling tubes, the mixture being chilled to about 57° F. in the first cylinder and to about 40° F. at the end of the second cylinder. The chilled mixture issuing from the last tube of the chilling machine is in the form of a heavy plastic mass having a temperature of about 40° F. and is sufficiently flowable that it may be conveniently pumped continuously to a crystallizer or worker.

This crystallizer or worker is of the type employing a long tube within which operates a perforate piston reciprocating between fixed perforate plates. Each movement of the piston forces the chilled mixture through both the perforations in the plates and the perforations in the piston to thereby work the mass and aid crystallization. This gives a uniform texture and body and all ingredients are uniformly incorporated. It is not necessary to drain off the milk but, on the contrary, the latter is retained in the product to provide moisture and curd so that a very economical process is thus provided. The capacity of the tube or crystallizer is about 2000 pounds per hour, and the chilled plastic mixture is continuously introduced to the tube, worked therein by the reciprocating perforate piston in cooperation with the fixed perforate plates, and discharged or extruded from the tube in continuous lengths through an outlet of reduced cross section. The extrusion nozzle or outlet may be either square, rectangular, round or any suitable shape. The mass is thus worked and simultaneously forced through the tube and extruded therefrom in a continuous shaped body or block. The extruded mass has a temperature of about 50° F. The pressure exerted by the perforate reciprocating piston is about 300 p.s.i. in its movement toward the extruding or shaping outlet or nozzle, and is about 100 p.s.i. in the opposite direction.

The continuous body or block issuing from the shaping nozzle of the crystallizer tube is conveniently cut in suitable lengths to average about 10 pounds, e.g., the rectangular unit having a 4 inch cross section is cut in 16 inch lengths. The lengths are then chilled for about two days at about 27° F. in a tempering room or run through a continuous chilling tunnel and are thereafter ready for the packaging machine. The chilling temperature may vary from 25° to 50° F.

The improved product has a waxy body which dissolves readily in the mouth after the manner of butter and is distinguished from usual margarine by the substantial reduction in characteristic margarine greasiness. The product has enhanced keeping qualities due to the absence of occluded air. In addition, the improved product has the appearance of butter and is brittle and breaks like regular churned butter at usual serving temperatures, such as 45° to 50° F.

In the foregoing example, we may employ as the plastic fat body and the dispersed fat globules any of the conventional margarine oils or fats, namely, cottonseed oil, soybean oil, lard, cocoanut oil, palm kernel oil, babassu oil, and mixtures of the same with each other and with milk fat, the oils being prepared usually by hydrogenation.

Conventional margarine contains at least 80% fat by weight and, in carrying out the present invention, as illustrated by the foregoing example, it will be noted that the plastic fat is used in amount of about 74% of the total finished product, while the finely divided homogenized fat is used in amount of about 6% by weight of the total finished product. In this connection, the amount of the homogenized fat introduced to the plastic fat in the vat may vary from .05% to about 7½% or higher of the weight of the margarine. In some cases, milk fat may be used instead of or admixed with the oils and fats mentioned above for making the homogenized emulsion, as, for instance, in the form of cream or a cream consisting of both milk fat and one or more of the vegetable fats. While we have described the homogenized emulsion as being formed from a mixture of approximately 30% fat, this may vary from about 18% to 35% as desired, it being important that the homogenized fat be relatively finely divided and broken up and encased in non-fat milk solids for incorporation in and uniform dispersion through the body of the plastic fat to obtain the improved margarine. The amount of waxiness appears to be in direct relation to the amount of homogenized fat present in the plastic fat, and the absence of conditions which promote smearing of either the plastic fat or the homogenized fat appears to contribute to the substantial lack of greasiness in the final product. For example, in the present invention we have a gentle reciprocating movement of the perforate piston in the tube or other confined chamber between the fixed perforate plates therein, which assures a gentle shearing action on the fat as well as uniform treatment and, moreover, the protein coating on the fat particles is not rubbed off, and thus the tendency toward promoting greasiness is precluded.

Instead of sweet skimmilk, as mentioned in the foregoing example, regular sweet milk or cultured skimmilk, which has been fermented with a starter, such as streptococus lactus, or mixtures of the various liquid milks, may be employed both in producing the homogenized fat dispersion or emulsion or for the added skimmilk and different milks may also be respectively used for the emulsion and the added milk.

In addition to using lectithin and "Emargol" in the foregoing example, other emulsifiers may be used, e.g., mono- and di-glycerides and derivatives of the same, or mixtures of these and other suitable emulsifiers may be used.

In preparing the skimmilk mixture, including the liquid milk, emulsifier and salt with or without coloring and flavoring, or the homogenized fat dispersion containing these ingredients, as explained above, it is important to maintain the same under conditions which will preclude freezing or souring until the mixture is introduced to the melted plastic fat in the vat. The coloring and flavoring may be added directly to the melted fat, if desired, or, as explained, to one of the milk mixtures just described. In this connection, Vitamin A or other desired fat-soluble vitamin, as well as a preservative, such as benzoate of soda, may be added to a milk mixture, or, if desired, directly to the melted fat in the vat.

Referring to the foregoing example, the body of plastic fat in the vat is usually melted at a temperature of about 120° to 150° F. and cooled to a temperature of about 110° to 120° F. before incorporating the other ingredients of the margarine. These ingredients, as explained, are incorporated by thorough mixing into the plastic fat and usually have been held at a temperature between about 35° and 40° F. at which souring and freezing are precluded. The uniform mixture is pumped from the vat directly and continuously through a closed system to the chilling machine or tube at a temperature of about 100° to 115° F., in which condition the mixture is free flowing, and the pumping pressure is between about 100 to 300 p.s.i. The heavy chilled mass issuing from the chilling tube has a temperature of about 40° to 45° F. and, as stated, is sufficiently flowable to be pumped to the worker or crystallizer and worked therein. This mixture is pumped directly continuously from the chilling machine to the worker or crystallizer also through a closed system. The mixture from the worker or crystallizer is extruded at a temperature of about 50° to 55° F. and the pressure of the perforate piston in the worker is about 100 to 400 p.s.i. on the stroke toward the extrusion nozzle and about 100 p.s.i on the return stroke. The procedure, as explained, is substantially continuous in a closed system without exposure to air and is economical in that the moisture and curd are not lost, but are retained both during manufacture and subsequent formation into units of predetermined size and shape. Moreover, the operation does not result in a smearing action on the fat but rather a gentle shearing action so that a desirable waxy body, in contrast to usual objectionable margarine greasiness, is obtained.

While we have expressed the relationship of the plastic fat to the homogenized fat on the basis of the total weight of the margarine, this can also be expressed as based on the total weight of the fat alone. Thus, assuming that the margarine will have approximately 80% fat by weight of the margarine composition, as is usual, the amount of homogenized fat may be expressed as about .0625% to 9.375% of the weight of the total fat.

The relative proportions of salt, emulsifiers, flavoring, coloring, vitamin and preservative where used, are within the skill of the usual worker in this art and, hence, are not critical. Margarine products of greater fat content are sometimes made and the reference to 80% fat is, therefore, for the purposes of illustration, although usual margarines with which this invention is concerned do not vary greatly above this standard fat content. The amount of liquid milk used, likewise, is conventional and within the scope of workers in this art.

The example illustrates use of cottonseed oil for both plastic and homogenized fats. However, different compatible fats, e.g., soybean oil for the plastic fat and cocoanut oil for the homogenized fat or vice versa, may be used or milk fat may be used for the homogenized fat alone or mixed with vegetable fat. In this connection, butter oil may be admixed with plastic fat, where desired, for forming the plastic fat body.

Products obtained by following the process described in the above example, but omitting the step of introducing the homogenized fat emulsion, show appreciable improvement over conventional margarines in the various respects indicated and are useful. The improvements manifested by the products of this invention, such as a waxy body, lack of greasiness, absence of occluded air, better appearance and flavor, and brittleness and breaking qualities, all of which are attributes of good butter, have been observed by substantial tests of the products. However, from these tests it is evident that the preferred process is that described in the above example and includes the incorporation of the homogenized fat and its dispersion throughout the plastic body as discrete particles of fat coated with non-fat milk solids.

We claim:

1. A process of making margarine including an edible fat which comprises incorporating in the melted fat an emulsion of fat and liquid milk with the fat in dispersed phase, chilling the mixture and working the same to produce margarine having dispersed therein the fat from the emulsion as discrete globules coated with non-fat milk solids.

2. The process according to claim 1 wherein the fat particles of the emulsion have a size between about .5 and 2.5 microns.

3. A process of making margarine which comprises incorporataing in a melted margarine composition including a body of plastic fat an emulsion of fat and liquid milk with the fat in dispersed phase containing about .05 to 7½% fat by weight of the margarine composition, thereafter chilling the mixture and working the same to produce margarine having dispersed therein the fat from the emulsion as discrete globules coated with non-fat milk solids.

4. A process according to claim 3 wherein the fat particles of the emulsion have a size between about .5 and 2.5 microns.

5. A process according to claim 1 wherein the composition contains in addition to the fat, also liquid milk and wherein during the chilling and working, this liquid milk and the milk of the emulsion are retained in the mixture.

6. A process according to claim 1 wherein the worked mixture is shaped while containing said liquid milk.

7. A process according to claim 1 wherein the worked mixture is extruded from the worker as a continuous body and simultaneously shaped.

8. A process according to claim 1 wherein the margarine composition is prepared at a single point.

References Cited in the file of this patent

UNITED STATES PATENTS

| | | |
|---|---|---|
| 1,144,539 | Grelck | June 29, 1915 |
| 1,603,155 | Shou | Oct. 12, 1926 |
| 1,663,913 | Leroudier | Mar. 27, 1928 |
| 1,985,496 | Harris | Dec. 25, 1934 |
| 2,125,391 | Musher | Aug. 2, 1938 |
| 2,197,457 | Werk et al. | Apr. 16, 1940 |
| 2,304,452 | Gudheim | Dec. 8, 1942 |
| 2,526,302 | Turgasen | Oct. 17, 1950 |
| 2,605,185 | Zacharriassen | July 29, 1952 |

OTHER REFERENCES

Bailey: Industrial Oil and Vat Products, 1951, page 282.